United States Patent
Wang et al.

(10) Patent No.: US 11,124,418 B2
(45) Date of Patent: Sep. 21, 2021

(54) ACTIVATED CARBONS WITH HIGH SURFACE AREAS AND METHODS OF MAKING SAME

(71) Applicant: AdvEn Industries, Inc., Edmonton (CA)

(72) Inventors: Tianfei Wang, Edmonton (CA); Xinwei Cui, Edmonton (CA); Renfei Wang, Edmonton (CA); Weixing Chen, Edmonton (CA)

(73) Assignee: ADVEN INDUSTRIES, INC., Edmonton (CA)

( * ) Notice: Subject to any disclaimer, the term of this patent is extended or adjusted under 35 U.S.C. 154(b) by 59 days.

(21) Appl. No.: 16/305,587

(22) PCT Filed: May 29, 2017

(86) PCT No.: PCT/CA2017/000135
§ 371 (c)(1),
(2) Date: Nov. 29, 2018

(87) PCT Pub. No.: WO2017/205960
PCT Pub. Date: Dec. 7, 2017

(65) Prior Publication Data
US 2019/0202702 A1     Jul. 4, 2019

Related U.S. Application Data

(60) Provisional application No. 62/343,073, filed on May 30, 2016.

(51) Int. Cl.
*C01B 32/348*     (2017.01)
*B01J 20/20*     (2006.01)
(Continued)

(52) U.S. Cl.
CPC ............ *C01B 32/348* (2017.08); *B01D 53/02* (2013.01); *B01J 20/20* (2013.01); *B01J 20/2808* (2013.01);
(Continued)

(58) Field of Classification Search
None
See application file for complete search history.

(56) References Cited

U.S. PATENT DOCUMENTS 3,835,064 A    9/1974   Shinomiya et al.
3,876,451 A    4/1975   Zall
(Continued)

FOREIGN PATENT DOCUMENTS

CN    101759181 A    6/2010
CN    103950929 A    7/2014
(Continued)

OTHER PUBLICATIONS

Ncibi et al. (2008), "Recent Patents on Activated Carbon Production and Applications", Recent Patents on Chemical Engineering, 2008, 1, 126-140.
(Continued)

*Primary Examiner* — Colin W. Slifka
(74) *Attorney, Agent, or Firm* — Field LLP

(57) ABSTRACT

Activated carbons with high surface areas are produced from a synergistic activation effect triggered at high temperatures by a predetermined combination of chemical activation agents derived from weak acidic salts, and/or weak basic salts, and/or neutral salts, and/or compounds. In one embodiment, a method of the present invention comprises mixing a carbon precursor with a first component comprising a first salt and at least one second component selected from the group consisting of a second salt, a compound and
(Continued)

combinations thereof, in an inert environment or in carbon dioxide and/or steam environment.

29 Claims, 5 Drawing Sheets

(51) Int. Cl.
| | |
|---|---|
| *B01J 20/28* | (2006.01) |
| *B01J 20/30* | (2006.01) |
| *C01B 32/312* | (2017.01) |
| *C01B 32/30* | (2017.01) |
| *C01B 32/324* | (2017.01) |
| *C01B 32/336* | (2017.01) |
| *B01D 53/02* | (2006.01) |
| *C02F 1/28* | (2006.01) |
| *H01G 11/34* | (2013.01) |
| *H01M 4/583* | (2010.01) |
| *H01M 4/96* | (2006.01) |

(52) U.S. Cl.
CPC ... *B01J 20/28066* (2013.01); *B01J 20/28083* (2013.01); *B01J 20/3021* (2013.01); *B01J 20/3042* (2013.01); *B01J 20/3078* (2013.01); *B01J 20/3085* (2013.01); *C01B 32/30* (2017.08); *C01B 32/312* (2017.08); *C01B 32/324* (2017.08); *C01B 32/336* (2017.08); *C02F 1/283* (2013.01); *H01G 11/34* (2013.01); *B01D 2253/102* (2013.01); *C01P 2006/12* (2013.01); *C01P 2006/17* (2013.01); *H01M 4/583* (2013.01); *H01M 4/96* (2013.01)

(56) References Cited

U.S. PATENT DOCUMENTS

| | | |
|---|---|---|
| 3,953,345 A | 4/1976 | Saito et al. |
| 3,969,268 A | 7/1976 | Fukuda et al. |
| 4,118,341 A | 10/1978 | Ishibashi et al. |
| 5,102,855 A | 4/1992 | Greinke et al. |
| 5,504,050 A | 4/1996 | Hayden |
| 7,410,510 B2 | 8/2008 | Takeshi et al. |
| 7,541,312 B2 | 6/2009 | Dietz et al. |
| 8,709,972 B2 | 4/2014 | Istvan et al. |
| 8,759,253 B2 | 6/2014 | De Leede |
| 8,784,764 B2 | 7/2014 | Gadkaree et al. |
| 8,927,103 B2 | 1/2015 | Kirschbaum et al. |
| 8,993,478 B2 | 3/2015 | Fuijii |
| 2005/0207962 A1 | 9/2005 | Dietz et al. |
| 2014/0011666 A1 | 1/2014 | Yoshizaki et al. |
| 2014/0037536 A1 | 2/2014 | Reimerink-Schats et al. |
| 2014/0175688 A1 | 6/2014 | Bohnert et al. |
| 2015/0329364 A1 | 11/2015 | Dong et al. |
| 2016/0368774 A1 | 12/2016 | Mitra et al. |

FOREIGN PATENT DOCUMENTS

| | | |
|---|---|---|
| CN | 10529797 A | 12/2015 |
| EP | 2081676 A1 | 7/2009 |
| EP | 2478957 A1 | 7/2012 |
| JP | S51-077594 A | 7/1976 |
| JP | S54-033293 A | 3/1979 |
| JP | 2008184359 A | 8/2008 |
| JP | 2016-050127 A | 4/2016 |
| WO | 2007114849 A2 | 10/2007 |
| WO | 2009011590 A1 | 1/2009 |
| WO | 2015175584 A | 11/2015 |

OTHER PUBLICATIONS

Guo et al. (1999), "Textural and chemical characterizations of activated carbon prepared from oil-palm stone with H2SO4 and KOH impregnation", Microporous Mesoporous Mats, 1999, 32, 111-117.

Lillo-Rodenas et al. (2001), "Preparation of activated carbons from Spanish anthracite: II. Activation by NaOH", Carbon, 2001,39, 751-759.

Gurten et al. (2012), "Preparation and characterization of activated carbon from waste tea using K2CO3", Biomass and Bioenergy, 2012, 37, 73-81.

ACTIVATED CARBONS WITH HIGH SURFACE AREAS AND METHODS OF MAKING SAME

FIELD OF THE INVENTION

The present invention discloses a method for the production of activated carbons without using strong acids or strong bases or environmentally-unfriendly $ZnCl_2$. More particularly, this invention is to disclose a method enabling a synergistic activation effect at high temperatures by adding preferred combinations of chemical activation agents derived from weak acidic salts, and/or weak basic salts, and/or neutral salts, and/or compounds to achieve high surface areas, high yields, less corrosion of processing facilities, inexpensive activating agents, and improved recovery efficiency of the activating agents.

BACKGROUND OF THE INVENTION

Activated carbons are carbonaceous materials featured by a large specific surface area, typically in the range of 500~2500 $m^2/g$. Two methods are used in manufacturing activated carbons; activation with chemicals (called chemical activation) and activation with oxidizing gases (called physical activation). The chemical activation process to produce activated carbons normally involves: 1) formation of a mixture of carbon precursors with a chemical activation agent, 2) thermal activation by heating the mixture to high temperatures for chemical reactions between the precursor and the chemical activation agent, 3) post treatment to remove chemical residues and the moisture. The physical activation process to produce activated carbons normally involves two steps for activation: a) carbonization or pyrolysis of carbon precursors and b) activation of carbon precursors at high temperatures in carbon dioxide and/or steam environments.

There is a wide choice of carbon precursors. Commercially available activated carbons are usually derived from natural materials, such as lignite, coal and coconut shell powders. As well, petroleum pitch, agricultural wastes and wood by-products, wastes from municipal and industrial activities, bio-masses, carbon fibers, carbohydrate precursors, resins, etc., have also been used or proposed for activated carbon production.

Chemical activation agents develop pores in activated carbons by severe chemical reactions between the chemical activation agent and the carbon precursor. There is a dilemma in producing activated carbons by chemical activation. To obtain activated carbons with high surface areas (1500~2500 $m^2/g$), chemical activation agents are normally chosen from strong acids, such as $H_2SO_4$ and $H_3PO_4$ (as taught in U.S. Pat. No. 3,835,064 to Shinomiya et al., WO 2009011590 A1 to Richard De et al.), and/or strong bases, such as KOH (U.S. Pat. No. 7,410,510 to Fujino et al., U.S. Pat. No. 8,784,764 to Gadkaree et al.) and NaOH (U.S. Pat. No. 7,410,510 to Fujino et al., Lillo-Rodenas et al. (2001), "Preparation of activated carbons from Spanish anthracite: II. Activation by NaOH", Carbon, 2001, 39, 751-759.) However, such strong acids and bases can also cause severe corrosion to the processing facilities, normally made of metallic materials. This increases operational costs and reduces recovery efficiency. In addition, strong acids and strong bases are difficult to handle in their transportation and storage. The use of chemicals with weaker activation ability is usually sufficient if activated carbons with moderate surface areas (500~1500 $m^2/g$) are to be made. For example, an activation method using less corrosive zinc chloride ($ZnCl_2$) was developed and commercialized. However, the use of $ZnCl_2$ is nowadays not recommended due to the toxicity of zinc. Potassium carbonate ($K_2CO_3$) has also been proposed to produce activated carbons because it is neither hazardous nor deleterious, and is frequently used as food additives; however, it has not been commercially employed for producing activated carbons, largely because of its weak ability of activation. More importantly, the use of the chemicals with weaker activation ability would also make the activated carbon with low surface areas that are less cost-effective and less competitive, as compared with those products made by physical activation.

Although physical activation is the most commonly used method in industry, the activated carbons produced by physical activation have limited surface areas, usually less than 1500 $m^2/g$. Recently, chemical activation agents have been added into the process of carbonization, the first step of physical activation, in a form of hybrid chemical and physical activation methods (U.S. Pat. No. 5,504,050 to Hayden et al., U.S. Pat. No. 8,709,972 to Istvan et al., U.S. Pat. No. 5,102,855 to Greinke et al., U.S. Pat. No. 7,541,312 to Dietz et al.). These hybrid methods, however, had yielded a limited increase in the surface area of activated carbons (to a value <2500 $m^2/g$). In addition, strong acids added in the carbonization step would cause the corrosion of processing facilities during the second step of physical activation.

Therefore, one of the objectives of the present invention is to produce activated carbons, either by chemical activation or by the hybrid chemical and physical activation, using chemical agents derived from weak acidic salts, and/or weak basic salts, and/or neutral salts, and/or compounds to avoid or minimize the issue of corrosion of processing facilities.

SUMMARY OF THE INVENTION

The present invention discloses a method of making activated carbons with high surface areas, ranging from about 1000~3500 $m^2/g$, without using strong acids or strong bases or environmentally-unfriendly agents such as $ZnCl_2$. The present method triggers a synergistic activation effect at high temperatures by preferred combinations of chemical activation agents derived from any one or weak acidic salts, weak basic salts, neutral salts, compounds and combinations thereof. According to one embodiment the present method comprises of (a) forming a mixture of a carbon precursor with a first component comprising a first salt, and one or more second components selected from at least one second salt, a compound and combinations thereof; and (b) activating said mixture by raising the temperature to a second higher temperature and soaking for a predetermined period of time in an inert environment. It may optionally also comprise the step of preheating said mixture to a first, intermediate temperature and soaking for a predetermined period of time in an inert environment.

In another embodiment of a hybrid chemical and physical activation method, the present method comprises (a) forming a mixture of a carbon precursor with a first component comprising a first salt and one or more second components selected from at least one second salt, a compound and combinations thereof; and (b) activating said mixture by raising the temperature to a second, higher temperature and soaking for a preset period of time under carbon dioxide and/or steam. It may also optionally comprise a step of preheating said mixture to a first intermediate temperature and soaking for a predetermined period of time in an inert environment.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings:

FIG. 2 is a graph of activation effect and yield vs. % of a second component using the results from Examples 1-6, wherein the activation process follows the conditions described in FIG. 1a;

Figure 1A:
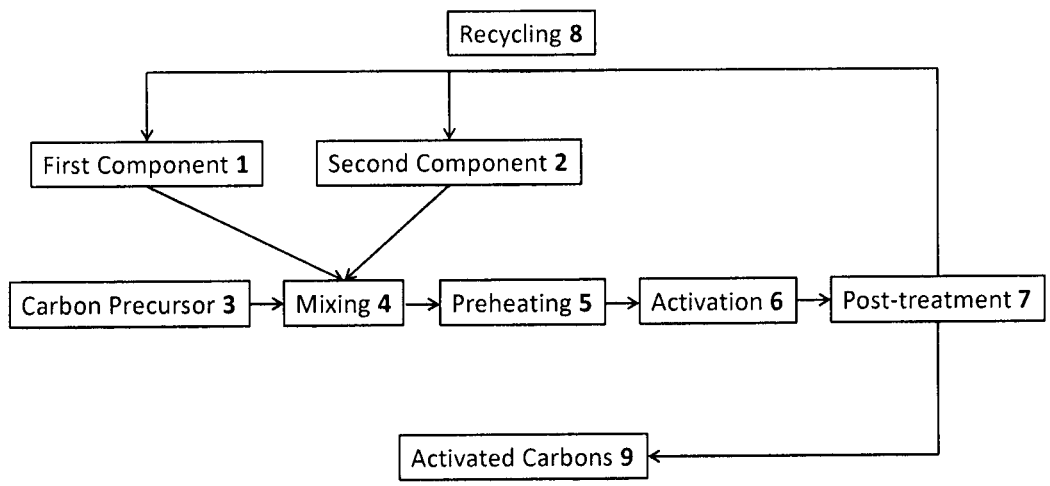
FIG. 1a is a flow process diagram of a chemical activation method of the present invention for making activated carbons with high surface areas.

The drawing is not necessarily to scale and in some instances proportions may have been exaggerated in order more clearly to depict certain features.

DETAILED DESCRIPTION OF THE INVENTION

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

Definitions

As used herein an activated carbon shall refer to any porous carbonaceous material comprising at least 75% elemental carbon and characterized by a BET (Brunauer-Emmett-Teller) surface area of at least 500 $m^2/g$ produced from chemical activation methods, physical activation methods, or the hybrid chemical and physical activation methods. As used herein the term an acidic salt shall refer to a salt formed between a strong acid and a weak base. As used herein the term a basic salt shall refer to a salt formed between a weak acid and a strong base. As used herein the term a neutral salt shall refer to a salt formed between a strong acid and a strong base. As used herein the term a compound shall refer to an entity consisting of two or more different atoms which associate via chemical bonds. As used herein the term yield shall refer to the weight percentage of the resulting activated carbons to the carbon precursors used. As used herein the term micropores shall refer to the pore diameter smaller than 2 nm, characterized by the BET method and calculated by the NLDFT (non-local density functional theory) model. As used herein the term mesopores shall refer to the pore diameter between 2 nm and 50 nm, as characterized by the BET method and calculated by the NLDFT model. As used herein the term surface area shall refer to specific surface area measured as $m^2/g$, obtained from the BET method.

Method of Making Activated Carbons with High Surface Areas

The present invention discloses a method of making activated carbons with high surface areas, ranging from about 1000~3500 $m^2/g$, without using strong acids or strong bases or environmentally-unfriendly chemicals such as $ZnCl_2$. The high surface area achieved from the present invention is possible because of a synergistic activation effect. The present inventors have surprisingly found that this synergistic activation is triggered at high temperatures by adding a preferred combination of chemical activation agents derived from the group consisting of weak acidic salts, weak basic salts, neutral salts, preferred compounds.

In one embodiment, described in FIG. 1a, categorized as chemical activation, the present method comprises of (a) forming a mixture of a carbon precursor with a first component comprising a first salt and one or more second components selected from at least one second salt, a compound and combinations thereof, and optionally containing a binder; and (b) activating said mixture by raising the temperature to a second higher temperature and soaking for a predetermined period of time in an inert environment. In a preferred embodiment, the process further involves preheating said mixture to a first, intermediate temperature and soaking, or maintaining the mixture at the intermediate temperature, for a predetermined period of time in an inert environment prior to activating the mixture.

Referring now to step 4 of mixing in FIG. 1a, there is no limitation to the mixing method in this invention. However, dry mixing through a dual shaft mixer is preferred. In some embodiments, the carbon precursor 3, the first component 1, and at least one second component 2 may be pulverized or ground into particles having an average size less than 5 mm before dry mixing.

The first salt of the first component comprises alkali salts, preferably, potassium carbonate or potassium bicarbonate. The second salt of the second component comprises one or more of the following three categories of salts: phosphorus and oxygen containing salts, nitrogen and oxygen containing salts, and sulfur and oxygen containing salts. Preferably the second salt comprises phosphorus and oxygen containing salts, and more preferably, the phosphorus and oxygen containing salts are phosphates. The compound of the second component comprises nitrogen-containing compounds, preferably, urea.

The avoidance of using strong acids, such as $H_2SO_4$ and $H_3PO_4$, or strong bases, such as KOH and NaOH, or environmentally-unfriendly chemicals, e.g., $ZnCl_2$, to produce activated carbons with high surface areas is advantageous in the following three aspects 1) the corrosion of the processing facilities has been minimized; 2) the cost of activating agents has been reduced since weaker activating agents are commonly less expensive, more dilute and safer to transport etc.; 3) the recovery efficiency of the activating agents used has been improved.

Recovery efficiency of the present activating agents is improved since corrosion is reduced, which in turns ensures that less of the activating agent is consumed in side corrosion reactions between the agents and the equipment. Therefore, more elements from the agents are maintained in the carbon materials to be recovered.

The present invention also sets no limitation to the type of carbon precursors 3 used in the process. The carbon precursors fit for in this method include, but not limited to, petroleum pitch; coconut shell powders; lignite or coal; municipal wastes and industrial by-products, including waste newspaper, waste tires, refuse derived fuel, PET bottle, waste carbon slurries and blast furnace slag, asphaltenes, biological wastes generated during lactic acid fermentation from garbage, and sewage sludge; bio-masses; agricultural wastes, including coir pith, bagasse, sago waste, banana pith, maize straw, silk cotton hull and maize cob, rice husk, rice hulls; fruit stones, including nutshells, olive stone, macadamia nuts, pecan shell, vetiver roots, and cassava peel; wood by-products, including coconut tree sawdust, bamboo, pinewood, sawdust; carbon fibers; vegetal origin, including seed fibers, bast fibers, leaf fibers, fibers from fruits, artificial fibers from cellulose, viscose, cuppramonium rayons and PVA fibers; carbohydrate precursors, including sucrose, lactose, starch, corn syrup, cellulose; resins, including polystyrenedivinylbenzene ion exchange resin, phenol-formaldehyde resin; and combinations thereof. In some embodiments, organic wastes are the preferred carbon precursors for this method. In another embodiment, coconut shells are the preferred carbon precursors for this method.

Of the first component 1, said first salt may be derived from basic or alkali salts, preferably, potassium containing salts. Suitable basic or alkali salts include, but not limited to, lithium acetate, lithium citrate, lithium carbonate, lithium bicarbonate, lithium hydrogen citrate, lithium chloride, sodium oxalate, sodium hydrogen phthalate, sodium hydrogen phthalate, sodium acetate, sodium citrate, sodium carbonate, sodium bicarbonate, sodium hydrogen citrate, sodium chloride, potassium oxalate, potassium hydrogen phthalate, potassium hydrogen phthalate, potassium acetate, potassium citrate, potassium carbonate, potassium bicarbonate, potassium hydrogen citrate, and potassium chloride. According to one embodiment, for example, the alkali salt is preferably potassium carbonate. In another embodiment, potassium bicarbonate is a preferred alkali salt. In another embodiment, potassium chloride is a preferred alkali salt.

Of the second component 2 one or more second salts may be derived from one or more of the following three categories, 1) phosphorus and oxygen containing salts, 2) nitrogen and oxygen containing salts, and 3) sulfur and oxygen containing salts. Examples include suitable second slates include, but not limited to, phosphates, perphosphate, thiophosphates, hydrogen phosphates, dihydrogen phospites, nitrates, nitrites, sulfates, persulfates, thiosulfates, hydrogen sulfates, sulfites, hydrogen sulfites. In one embodiment, phosphates are preferred as the second salt of second component 2.

Of the second component 2, the compound may be derived from a nitrogen-containing compound, comprising two or more groups selected from the groups consisting of —NH2, =O2, —OH, and =NH or —NH—. Examples of suitable compounds for the second component include, but are not limited to, urea, N-butylurea, biuret, biguanide, ammeline, ligosulphonate. According to one embodiment, urea is preferred as the compound of second component 2.

The second component 2 may also comprise any combination of the second salts and the compounds described above.

The present mixture in step 4 may optionally comprise a binder. Examples of binders include, but are not limited to, cellulosic binders including methylcellulose, ethylcellulose, hydroxybutylcellulose, hydroxybutylmethylcellulose, hydroxyethylcellulose, hydroxymethylcellulose, hydroxypropylcellulose, hydroxypropylmethylcellulose, hydroxyethylmethylcellulose, and sodium carboxylmethyl cellulose; resinous binders including polyvinylidene chloride, polyvinyl chloride, polyvinyl alcohol, resole, novolac resins; bitumen, asphaltenes, and starch.

The present invention differs from the prior art (for example, WO 2009011590 A1 to Richard De et al., U.S. Pat. No. 7,541,312 B2 to Dietz et al., U.S. Pat. No. 3,835,064 to Shinomiya et al., WO 2007114849 A2 to Buiel et al., U.S. Pat. No. 5,102,855 A to Greinke et al.) in the avoidance of using strong acids, such as $H_2SO_4$ and $H_3PO_4$, or strong bases, such as KOH and NaOH, or environmentally-unfriendly chemicals, e.g., $ZnCl_2$, to produce activated carbons with high surface areas. In addition to advantages discussed above, strong acids and strong bases are difficult to handle in their transportation and storage. In one embodiment, the corrosion rate caused by the mixture of first salt 1 and second salt and/or compound 2 together is only 1/1000 of that caused by KOH. In another embodiment, dehydrating agents which can also be corrosive may be excluded from the mixtures (either excluded from the first component 1 or from the second component 2) to reduce the corrosion attack.

Figure 2:
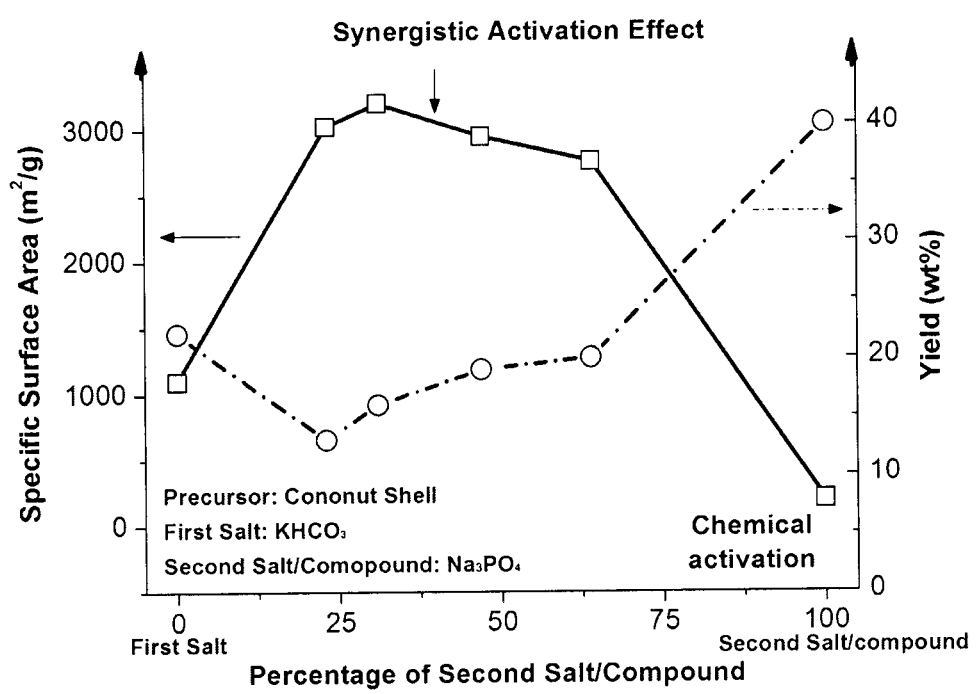

The present invention further differs from the prior art (for example, U.S. Pat. No. 7,541,312 B2 to Dietz et al., U.S. Pat. No. 3,835,064 to Shinomiya et al., WO 2007114849 A2 to Buiel et al., U.S. Pat. No. 5,102,855 A to Greinke et al., U.S. Pat. No. 8,709,972 B2 to Istvan et al., E.P. Pat. No. 2,478, 957 A1 to Reimerink-Schats et al., U.S. Pat. No. 3,876,451 A to Zall et al., U.S. Pat. No. 5,504,050 to Hayden et al.) in triggering a synergistic activation effect at high temperatures from a preferred combination of a first component comprising a first salt 1 and one or more second components 2 selected from at least one second salt, a compound and combinations thereof, to produce microporous activated carbons with high surface areas and high yields. The synergistic activation effect is apparent in FIG. 2. Referring now to FIG. 2, also shown in Examples 1-6, the surface areas of activated carbons activated from only first salt 1 (1100 $m^2$/g) or only second salt 2 (200 $m^2$/g) are much lower than those activated from the mixtures of both (3206 $m^2$/g). The latter is almost triple the sum of the surface areas from the former two cases, indicating a strong synergistic enhancement in surface area. As discussed in Example 3 below, the yield of activated carbons with the surface area of ~3000 $m^2$/g produced from the present invention is 20 wt %, much larger than that of activated carbons produced from a strong base, KOH, 8 wt % (Example 7). In one embodiment, the yield of activated carbons with a surface area of >2000 m$^2$/g produced from the present invention is 40~45 wt % (Example 8).

The present method further comprises (c) activating said mixture by raising the temperature to a second higher temperature and soaking for a predetermined period of time in an inert environment. The chemical activation takes place in step 6, wherein the activation temperature is in the range of 600° C. to 1000° C., preferably, in the range of 700° C. to 900° C. The soaking periods at the activation temperature are in the range of less than 10 min to 20 h, preferably, in the range of 0.2 h to 6 h. There are no additional chemical agents added in step 6. The pressure in the reactor controlled during this step is in the range of 0.01 Torr to 10$^4$ Torr.

In a preferred embodiment, the present method optionally further comprises preheating 5 said mixture to a first, intermediate temperature and soaking for a predetermined period of time in an inert environment, prior to activating. The intermediate temperatures in preheating step 5 are in the range of 150° C. to 600° C. The soaking period of time at the intermediate temperature is in the range of less than 10 min to 10 h, preferably, in the range of 0.2 h to 6 h. The pressure in the reactor controlled during this step is preferably in the range of 0.01 Torr to 10$^4$ Torr.

Exemplary inert atmospheres in steps 5 and 6 may include at least one selected from nitrogen, argon, and the noble gases. Steps 5 and 6 are typically carried out in a furnace capable of attaining the high temperatures required. The examples of the furnaces are, but not limited to, tube furnaces, rotary furnaces, and belt furnaces. In one embodiment, a fluidized bed reactor is used in this method to conduct optional step 5 and step 6, wherein the optional preheating and the activation parameters may need to adjust accordingly. In another embodiment, a microwave is used in this method to conduct optional step 5 and step 6, wherein the optional preheating and the activation parameters may need to adjust accordingly. All equipment that can be used to provide energy or temperature to trigger the synergistic activation effect and conduct the chemical activation is also within the scope of in the present invention.

In one embodiment, step 7 of post treatment in FIG. 1a may comprise, but not limited to, washing, drying, and pulverization.

In FIG. 1a, step 8 is the recycle of the first component 1 and/or the second component 2. Since little to no amount of the first and second components is consumed by corrosion activity, corrosion of the processing facilities has been minimized and recycles of the first component 1 and/or the second component 2 may achieve a very high percentages. In one embodiment, the recovery efficiency can achieve about 90% of the first component 1, and about 80% of the second component 2.

The present invention includes micropore-dominant activated carbons made according to the methods recited hereinabove. Micropore-dominant activated carbons are characterized as having a high surface area between about 1000 m$^2$/g and about 3500 m$^2$/g, preferably, above about 2000 m$^2$/g; a yield between 8 wt % and 50 wt % based on the initial weight of the carbon precursor, preferably, in the range of about 15 wt % to about 40 wt %.

In FIG. 1a, activation carbons 9 are micropore-dominated activated carbons with the volume percentage of micropores (<2 nm) being in the range of about 50% to about 85%, the volume percentage of mesopores (2~50 nm) being in the range of about 15% to 50%. It is further possible by methods of the present invention to adjust pore structure (pore size distribution) by changing 1) the ratios of any one of the carbon precursor 3 to first component 1; the first component 1 to the second component 2; and/or the carbon precursor 3 to the second component 2; 2) the activation temperature; 3) the type of carbon precursor.

Figure 3A:
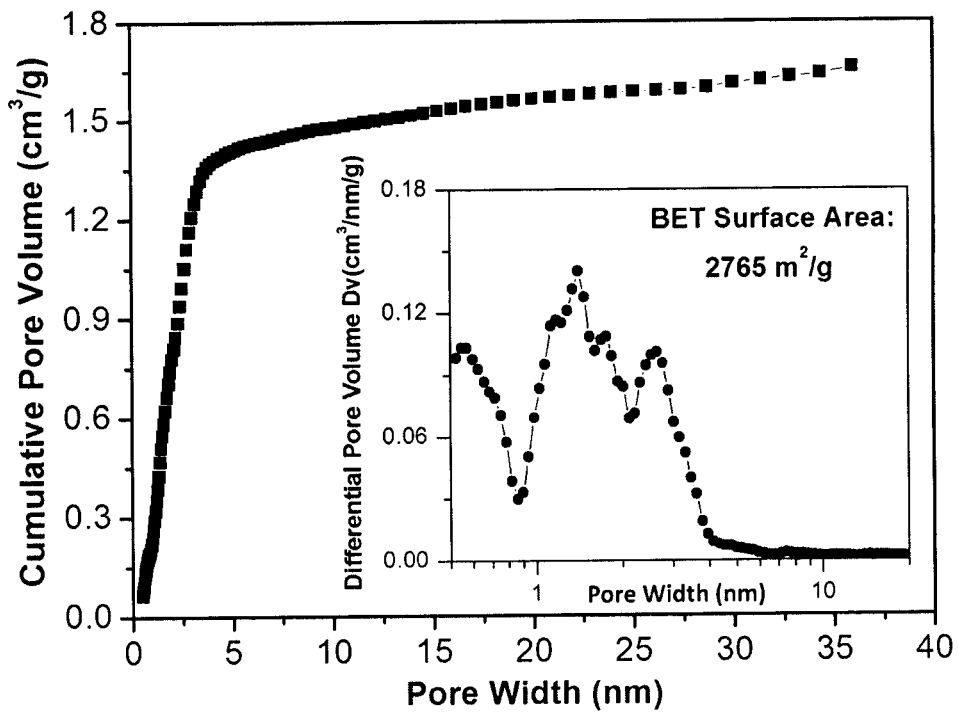
FIG. 3a are graphs of cumulative pore volume and (inset) pore-size distribution vs. pore width of activated carbons made from an embodiment of a process with the conditions described in Example 2.
Figure 3B:
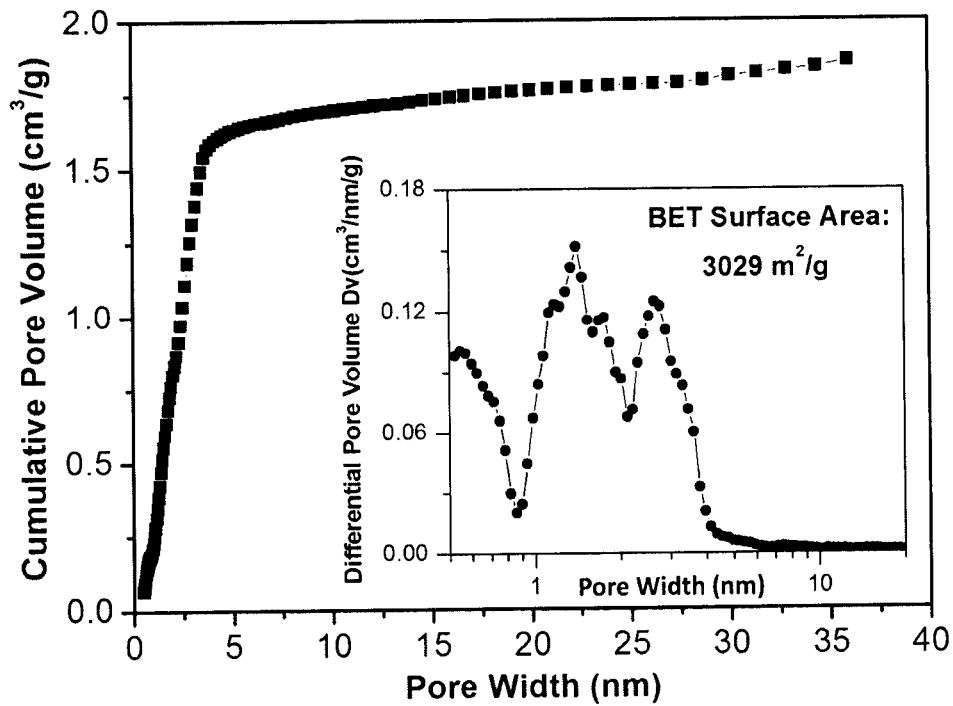
FIG. 3b are graphs of cumulative pore volume and (inset) pore-size distribution vs. pore width of activated carbons made from an embodiment of a process with the conditions described in Example 4.
Figure 3C:
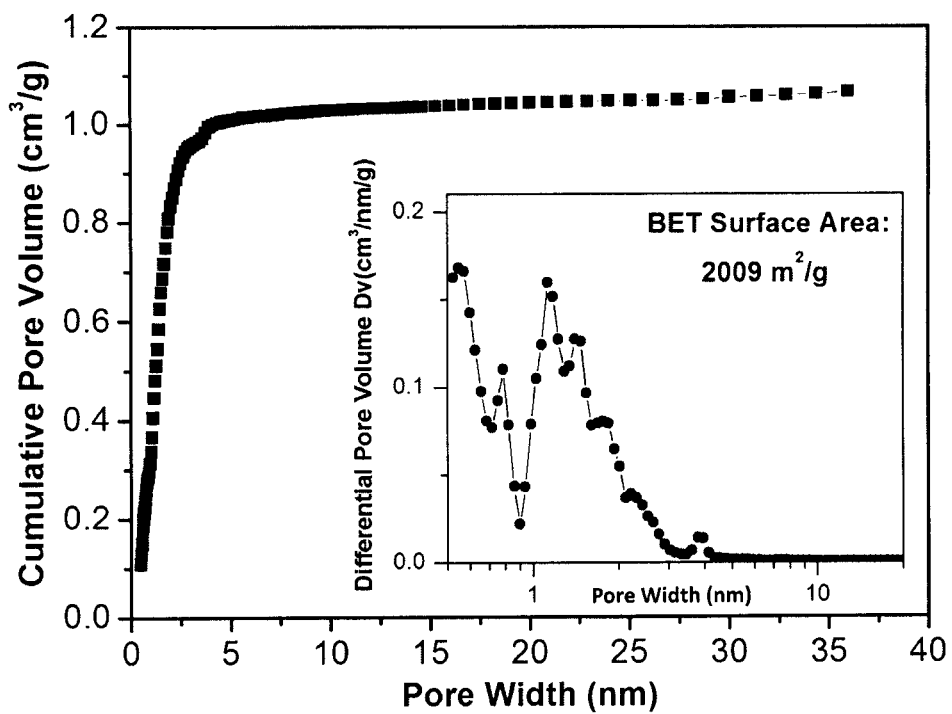
FIG. 3c are graphs of cumulative pore volume and (inset) pore-size distribution vs. pore width of activated carbons made from an embodiment of a process with the conditions described in Example 8.

FIG. 3a, FIG. 3b derived from Examples 2 and 4 show that the average pore size is increased by increasing the ratio of the carbon precursor 3 to the first component 1. When the ratio is 2 to 0.9, over 55% of pores are micropores and around 23% of pores are in the range of 2 nm to 4 nm. When the ratio is between 2 to 5.43, over 50% of pores are micropores and around 49% of pores are in the range of 2 nm to 4 nm. In one embodiment, the pore structure is also dependent on the type of carbon precursors used in this method. As shown in FIG. 3c and Example 8, when asphaltenes were used as carbon precursors, the obtained activated carbons possess over 83% micropores and around 17% mesopores. This pore structure is very different from that obtained when coconut shells were used as carbon precursors, as shown in FIG. 3a and FIG. 3b.

The present invention further discloses a method of making activated carbons with high surface areas, ranging from 1000~3000 m$^2$/g. In one embodiment, also described in FIG. 1b, categorized as a hybrid chemical and physical activation method, the present method comprises of (a) forming a mixture of a carbon precursor with a first component comprising a first salt and one or more second components selected from at least one second salt, a compound and combinations thereof, and optionally containing a binder; and (b) activating said mixture by raising the temperature to a second, higher temperature and soaking for a predetermined period of time under an oxidizing environment. The method may preferably further comprise an optional step of preheating said mixture to a first, intermediate temperature and soaking for a predetermined period of time in an inert environment, prior to activation.

Figure 1B:
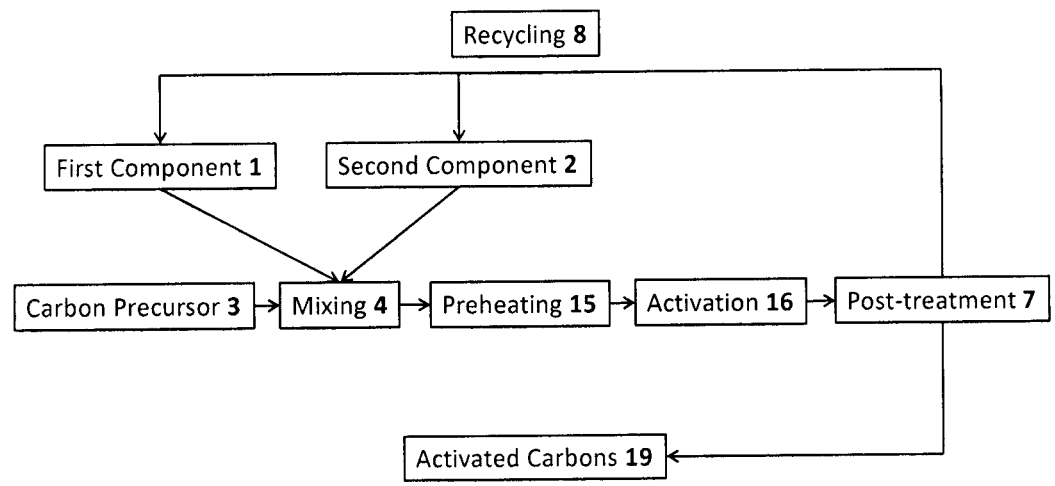
FIG. 1b is a flow process diagram of a hybrid chemical and physical activation method of the present invention for making activated carbons with high surface areas.

Referring now to FIG. 1b, said first component 1, said second component 2, said carbon precursors 3, and said mixing step 4 are described in FIG. 1a. The synergistic activation effect at high temperatures is again triggered from using a preferred combination of a first component 1 and at least one second component 2 in this hybrid chemical and physical activation method. In this hybrid activation method, the amount of the components used is lower than that used in the pure chemical activation method as shown in FIG. 1a and described in Examples 9-14.

The present hybrid method preferably further comprises preheating said mixture to a first, intermediate temperature and soaking for a preset period in an inert environment. The intermediate temperatures in step 15 are in the range of 200° C. to 1000° C. The soaking periods at the intermediate temperature are in the range of less than 10 min to 10 h, preferably, in the range of 0.2 h to 6 h. The pressure in the reactor controlled during this step is in the range of 0.01 Torr to 10$^4$ Torr.

Exemplary inert atmospheres for step 15 may include at least one selected from nitrogen, argon, and the noble gases.

The present method further comprises (c) activating said mixture by raising the temperature to a second, higher temperature and soaking for a predetermined period of time under an oxidizing environment. The activation takes place in step 16, wherein the oxidizing environment comprising at least one oxygen-containing component selected from the group consisting of carbon dioxide, air, steam and mixtures thereof. The activation temperature in step 16 is in the range of 800° C. to 1200° C., preferably, in the range of 900° C. to 1100° C. The soaking periods at the activation temperature are in the range of less than 10 minutes to 20 h, preferably, in the range of 0.2 h to 6 h. The pressure in the reactor controlled during this step is in the range of 0.01 Torr to $10^4$ Torr.

Step 16 and optional step 15 are typically carried out in a furnace capable of attaining the high temperatures required. The examples of the furnaces are, but not limited to, tube furnaces, rotary furnaces, and belt furnaces. In one embodiment, a fluidized bed reactor is used in this method to conduct steps 15 and 16, wherein the preheating and activation parameters may need to adjust accordingly. In another embodiment, a microwave is used in this method to conduct steps 15 and 16, wherein the preheating and activation parameters may need to adjust accordingly. All equipment that can be used to provide energy or temperature to trigger the synergistic activation effect and conduct the chemical activation is also within the scope of in the present invention.

In one embodiment, step 7 of post treatment in FIG. 1b may comprise, but not limited to, washing, drying, and pulverization.

In FIG. 1b, step 8 is recycle of the first component 1 and/or the second component 2. In one embodiment, the recovery efficiency can achieve 90% recover of the second component 2, and 90% recover of the first component 1.

Figure 3D:
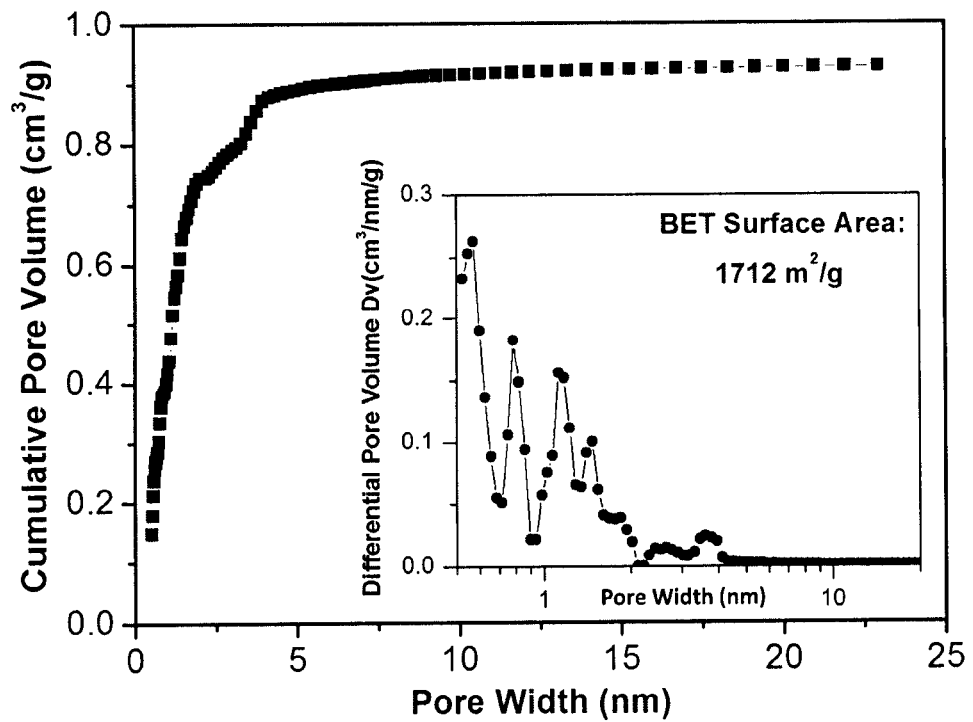
FIG. 3d are graphs of cumulative pore volume and (inset) pore-size distribution vs. pore width of activated carbons made from an embodiment of a process with the conditions described in Example 15.

In FIG. 1b, activation carbons 19 are microporous activated carbons with the volume percentage of micropores (<2 nm) being in the range of 50% to 85%, the volume percentage of mesopores (2~50 nm) being in the range of 15% to 50%. The present invention has another advantage that the pore structure (pore size distribution) is able to be adjusted by changing 1) the ratios of any one of the carbon precursor 3 to first component 1; the first component 1 to the second component 2; and/or the carbon precursor 3 to the second component 2; 2) the activation temperature; 3) the type of carbon precursor. In one embodiment, the pore structure is also dependent on the type of carbon precursors used in this method, as shown in FIG. 3d and described in Example 15, wherein over 83% of pores are micropores and around 15% of pores are in the range of 2 nm to 4 nm when asphaltenes were used as carbon precursors.

Figure 4:
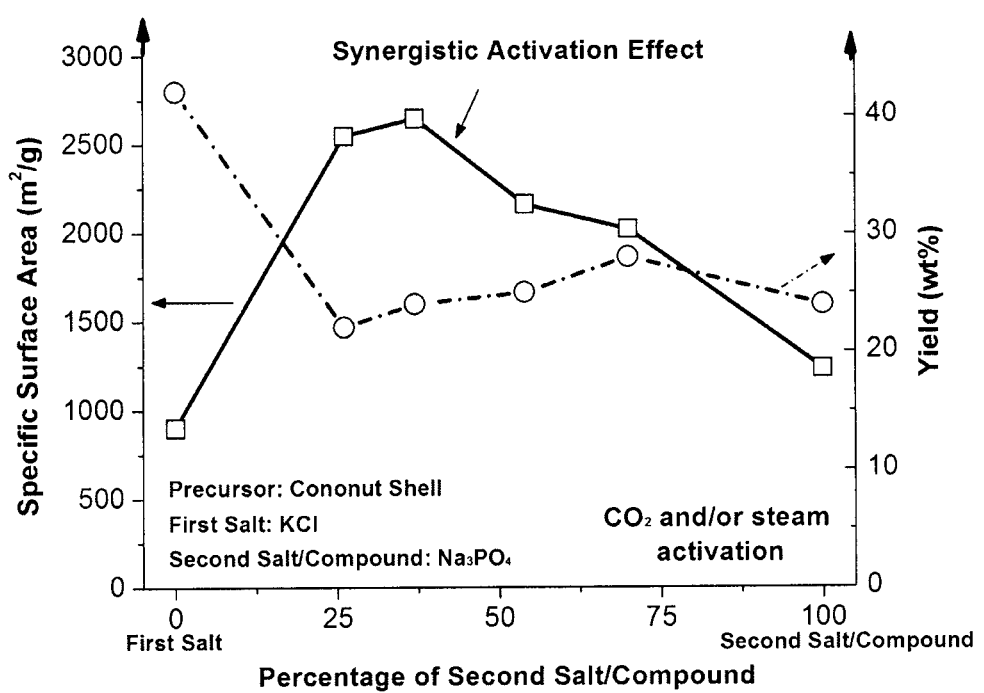
FIG. 4 is a graph of activation effect and yield vs. percentage of the second component using the results from Examples 9-14, wherein the activation process follows the conditions described in FIG. 1b.

The synergistic activation effect of the present methods is apparent in FIG. 4. Referring now to FIG. 4, also as described in Examples 9-14, the surface areas of activated carbons activated by adding first salt 1 only (900 $m^2/g$) or second salt 2 only (1236 $m^2/g$) are much lower than those activated by adding the mixtures of both (2648 $m^2/g$). The latter is also higher than the sum of the surface areas from the former two cases, indicating a strong synergistic enhancement in surface area. In one embodiment, the yield of activated carbons with a surface area of ~1700 $m^2/g$ produced from the present invention is 50~55 wt %, based on the initial weight of the carbon precursor (Example 15). In another embodiment, dehydrating agents may be excluded from the mixtures (either excluded from the first component 1 or from the second component 2) to minimize the corrosion attack.

The present methods provide a cost-effective method to produce activated carbons with high surface areas. The present invention, in its capability of adjusting the pore structures, makes the resulting microporous activated carbons potential to be used in applications, but not limited to, ultracapacitors, batteries, fuel cells, water treatment and purification, air/gas treatment or purification, gold recovery, mercury removal, medical uses, cosmetics, and catalyst supporters.

In the case of ultracapacitors for example, using the present activated carbons with a surface area of about 2700 $m^2/g$, and an apparent density of about 0.22 g/cc, the capacitance of an electrode tested in the form of 50 F full pouch cells using a commercial organic electrolyte of 1 mol/L Tetraethylammonium Tetrafluoroborate (Et4NBF4) in Acetonitrile (AN) is between 180 F/g and 200 F/g, much higher than the capacitance of 100~130 F/g more commonly seen in commercial ultracapacitors. Using the present activated carbons with a surface area of about 2400 $m^2/g$, and an apparent density of ~0.26 g/cc, the capacitance of the electrode tested in the form of 50 F full pouch cells using the commercial organic electrolyte of 1 mol/L $Et_4NBF_4$ in AN is between 150 F/g and 170 F/g. This shows a full-cell performance improvement of about 20% in terms of volumetric and gravimetric performance as compared to commercial ultracapacitors. Furthermore, since the present method produces activated carbons with high purity, high cycling performance in the order of around 1 million cycles has also been observed for ultracapacitor electrodes made from the present activated carbons.

In the case of lithium-sulfur batteries for example, sulfur can be impregnated into activated carbons. Using the present activated carbons having a surface area of about 3000 $m^2/g$ as the sulfur cage, sulfur loading in the resulted carbon-sulfur compound can reach 80 wt %. Furthermore, the present activated carbon when used as a cage also protects the embedded sulfur from dissolving into the electrolyte, which improves the cycle life of lithium-sulfur batteries. The present activated carbons can also be used in hybrid supercapacitors and compared to lithium-ion anodes and/or lithium-ion cathodes and/or NiOOH, for example to improve the capability of ion adsorption in the batteries. The present activated carbons can further be used as an additive in electrodes in various batteries to improve rate capabilities, including lithium-ion batteries, lithium-air batteries, Ni—H, Ni—Cd, Ni—Zn, Lead-acid batteries, among others.

In the case of water treatment and purification, air/gas treatment or purification, cosmetics, gold recovery, mercury removal for example, the present activated carbons have very large surface areas and controllable pore size to adsorb/absorb harmful organic or gaseous molecules or metallic elements. In addition, the present group of activated carbons can be used as catalyst supporters to carry a large amount of catalyst nanoparticles in these applications for chemical adsorption/conversion of harmful substances.

Similar usage of activated carbons can also be applied to medical uses and fuel cells. For example, using activated carbon as catalyst supporters for enhanced chemical reactions.

Although the particular methods herein shown and described in detail are capable of achieving the above described objectives of the invention, it is understood that the description and drawings presented herein represent some, but not all, embodiments that are broadly contemplated. Methods that are disclosed may thus comprise variations other than those disclosed.

As indicated above, preheating steps 5 and 15 in FIG. 1 may or may not be present, or these steps may be made up of multistage preheating steps. Step 6/16 and optional step 5/15 in FIG. 1 may be conducted at a reduced pressure than those previously listed, in the reaction chamber, e.g., in a furnace. Therefore, the scope of the present invention fully encompasses other embodiments that may be obvious to those skilled in the art.

EXAMPLES

The present invention will be described in further detail below through working examples.

Examples 1-6

Activated carbons with high surface areas were produced using chemical activation with and without a synergistic activation effect being triggered. Coconut shell (2 g), trisodium phosphate (1.62 g), and potassium bicarbonate (3.62 g) were pulverized and dry mixed at ambient temperature in Example 1. In Examples 2-4, the amount of potassium bicarbonate was changed to 0.9 g, 1.81 g, 5.43 g, respectively, while others were maintained the same. In order to prove the synergistic activation effect, the comparative Examples 5 and 6 were also conducted, wherein potassium bicarbonate was 0 g but trisodium phosphate was 1.62 g in Example 5, and trisodium phosphate was 0 g but potassium bicarbonate was 3.62 g in Example 6, while coconut shell was maintained at 2 g. In all 6 examples, the mixtures were preheated to 200° C. for 1 h and immediately activated at 800° C. for 1 h in nitrogen-protected environment. The temperature was then cooled to ambient temperature within 5 h. During the whole process, the nitrogen gas flow rate was controlled at 1 oven vol/h. The activated mixtures were washed and dried to obtain activated carbons. The BET surface area and the yield of the activated carbons in 6 examples are listed in Table 1 and also shown in FIG. 2.

TABLE 1

Surface Area and Yield of Activated Carbon Made with and without the Synergistic Activation Effect

| Example | Coconut Shell | Potassium Bicarbonate | Trisodium Phosphate | Surface Area | Yield |
|---|---|---|---|---|---|
| 1 | 2 g | 3.62 g | 1.62 g | 3206 $m^2/g$ | 16 wt % |
| 2 | 2 g | 0.9 g | 1.62 g | 2765 $m^2/g$ | 20 wt % |
| 3 | 2 g | 1.81 g | 1.62 g | 2954 $m^2/g$ | 19 wt % |
| 4 | 2 g | 5.43 g | 1.62 g | 3029 $m^2/g$ | 13 wt % |
| 5 | 2 g | 0 | 1.62 g | 200 $m^2/g$ | 40 wt % |
| 6 | 2 g | 3.62 g | 0 g | 1100 $m^2/g$ | 22 wt % |

As seen in Table 1 and FIG. 2, the synergistic activation effect was triggered as long as both potassium bicarbonate in first salt 1 and trisodium phosphate in second salt 2 were added together to the mixtures. The BET surface area can be improved to 3206 $m^2/g$ at the optimized ratio among coconut shell, potassium bicarbonate, and trisodium phosphate. Without adding either potassium bicarbonate or trisodium phosphate, the surface area is much lower.

Comparative Example 7

Coconut shell (2 g) and potassium hydroxide (2 g) were pulverized and dry mixed at ambient temperature in Comparative Example 7. All the following activation and post treatment steps are the same as Examples 1-6. The resulting activated carbon has a BET surface area of 3146 $m^2/g$ and a yield of 8 wt %.

Comparative Example 8

Asphaltenes in solids (2 g), trisodium phosphate (1.62 g), and potassium bicarbonate (3.62 g) were pulverized and dry mixed at ambient temperature in Comparative Example 8. All the following activation and post treatment steps are the same as Examples 1-6. The resulting activated carbon has a BET surface area of 2009 $m^2/g$ and a yield of 42 wt %.

Examples 9-14

Activated carbons with high surface areas were produced using hybrid chemical and physical activation with and without synergistic activation effect being triggered. Coconut shell (2 g), trisodium phosphate (1.13 g), and potassium chloride (1.90 g) were pulverized and dry mixed at ambient temperature in Example 9. In Examples 10-12, the amount of potassium chloride was changed to 0.48 g, 0.95 g, 2.86 g, respectively, while others were maintained the same. In order to prove the synergistic effect, the comparative Examples 13 and 14 were also conducted, wherein potassium chloride was 0 g but trisodium phosphate was 1.13 g in Example 13, and trisodium phosphate was 0 g but potassium chloride was 1.90 g in Example 14, while coconut shell was maintain at 2 g. In all 6 examples, the mixtures were preheated to 700° C. for 2 h in nitrogen-protected environment and activated at 1000° C. for 2 h in carbon dioxide environment. The temperature was then cooled to ambient temperature within 5 h in nitrogen-protected environment. During the process, the nitrogen gas flow rate was controlled at 1 oven vol/h, and the carbon dioxide gas flow rate was controlled at 1 oven vol/h. The activated mixtures were washed and dried to obtain activated carbons. The BET surface area and the yield of the activated carbons in 6 examples are shown in Table 2 and also in FIG. 4.

TABLE 2

Surface Area and Yield of Activated Carbon Made with and without the Synergistic Activation Effect under $CO_2/H_2O$ activation environment

| Example | Coconut Shell | Potassium Chloride | Trisodium Phosphate | Surface Area | Yield |
|---|---|---|---|---|---|
| 1 | 2 g | 1.90 g | 1.13 g | 2648 $m^2/g$ | 24 wt % |
| 2 | 2 g | 0.48 g | 1.13 g | 2025 $m^2/g$ | 28 wt % |
| 3 | 2 g | 0.95 g | 1.13 g | 2164 $m^2/g$ | 25 wt % |
| 4 | 2 g | 2.86 g | 1.13 g | 2549 $m^2/g$ | 22 wt % |
| 5 | 2 g | 0 g | 1.13 g | 1236 $m^2/g$ | 26 wt % |
| 6 | 2 g | 1.90 g | 0 g | 900 $m^2/g$ | 42 wt % |

As seen in Table 2 and FIG. 4, the synergistic activation effect was triggered as long as both potassium chloride in first salt 1 and trisodium phosphate in second salt 2 were added together to the mixtures. The BET surface area can be improved to 2648 $m^2/g$ at the optimized ratio among coconut shell, trisodium phosphate, and potassium chloride. Without adding either trisodium phosphate or potassium chloride, the surface area is much lower.

Comparative Example 15

Asphaltenes in solids (2 g), trisodium phosphate (1.13 g), and potassium chloride (1.90 g) were pulverized and dry mixed at ambient temperature in Comparative Example 15. All the following activation and post treatment steps are the same as Examples 9-14. The resulting activated carbon has a BET surface area of 1712 $m^2/g$ and a yield of 54 wt %.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

What is claimed is:

1. A method of making activated carbons, said method comprising the steps of:
   (a) mixing a carbon precursor with a first component comprising a first salt comprising potassium containing salts, and one or more second components comprising at least one second salt comprising nitrogen and oxygen containing salts, and a nitrogen containing compound to form a mixture, said mixture being free from any strong acids, strong bases or $ZnCl_2$;
   (b) preheating of said mixture to a first temperature and soaking for a predetermined period of time in an inert environment; and
   (c) activating said mixture in an inert environment by raising the temperature to a second, temperature of from 600° C. to 900° C. and soaking for a predetermined period of time.

2. The method of claim 1 wherein said carbon precursor is selected from the group consisting of petroleum pitch; coconut shell powders; lignite or coal; municipal wastes; industrial by-products; asphaltenes; biological wastes; organic wastes; bio-masses; agricultural wastes; wood by-products; fruit shells; nut shells; carbon fibers; synthetic polymers; carbohydrates; resins; and combinations thereof.

3. The method of claim 2, wherein the carbon precursor is selected from organic wastes and petroleum pitch.

4. The method of claim 1, wherein the step of preheating the mixture is carried out at a temperature between about 150° C. to about 1000° C. and soaked for a period of time in the range of less than 10 min to 10 h.

5. The method of claim 1, wherein the step of activating the mixture is soaked for a period of time in the range of less than 10 min to 20 h.

6. The method of claim 1, wherein said activated carbons thus made have a surface area of between 1000 $m^2/g$ and 3500 $m^2/g$.

7. The method of claim 1, wherein 40 to 45 wt % of activated carbons thus made have a surface area of at least 2000 $m^2/g$.

8. The method of claim 1, wherein 20 wt % of activated carbons thus made have a surface area of at least 3000 $m^2/g$.

9. The method of claim 1, wherein the volume percentage of micropores in the activated carbons thus made is from 50% to 85%.

10. The method of claim 1, wherein the volume percentage of mesopores in the activated carbons thus made is from 15% to 50%.

11. The method of claim 1, wherein pore size distribution of the activated carbons thus made is adjustable by adjusting a factor selected from the group consisting of the ratio of carbon precursor to first component; the ratio of first component to the second component; the ratio of carbon precursor to the second component; activation temperature; type of carbon precursor, and combinations thereof.

12. The method of claim 1, wherein the activated carbons thus made are for use in ultracapacitors, batteries, fuel cells, water treatment and purification, air/gas treatment or purification, gold recovery, mercury removal, medical uses cosmetics, and catalyst supporters.

13. The method of claim 1 wherein the mixture of step (a) is free from strong acids selected from the group consisting of H2SO4 and H3PO4.

14. The method of claim 13, wherein the mixture of step (a) is free from strong bases selected from the group consisting of KOH and NaOH.

15. The method of claim 14, further comprising mixing a binder to the carbon precursor in the mixing step.

16. The method of claim 15 wherein said first salt comprises alkali salts.

17. The method of claim 16, wherein the alkali salt is selected from the group consisting of lithium acetate, lithium citrate, lithium carbonate, lithium bicarbonate, lithium hydrogen citrate, lithium chloride, sodium oxalate, sodium hydrogen phthalate, sodium hydrogen phthalate, sodium acetate, sodium citrate, sodium carbonate, sodium bicarbonate, sodium hydrogen citrate, sodium chloride, potassium oxalate, potassium hydrogen phthalate, potassium hydrogen phthalate, potassium acetate, potassium citrate, potassium carbonate, potassium bicarbonate, potassium hydrogen citrate, potassium chloride, and derivatives thereof.

18. The method of claim 17, wherein the alkali salt is selected from the group consisting of potassium carbonate, potassium bicarbonate and potassium chloride.

19. The method of claim 15, wherein said binder is selected from the group consisting of cellulosic binders, resinous binders, bitumen, asphaltenes, and starch.

20. The method of claim 19, wherein said cellulosic binders are selected from the group consisting of methylcellulose, ethylcellulose, hydroxybutylcellulose, hydroxybutylmethylcellulose, hydroxyethylcellulose, hydroxymethylcellulose, hydroxypropylcellulose, hydroxypropylmethylcellulose, hydroxyethylmethylcellulose and sodium carboxylmethyl cellulose.

21. The method of claim 19, wherein said resinous binders are selected from the group consisting of polyvinylidene chloride, polyvinyl chloride, polyvinyl alcohol, resole and novolac resins.

22. The method of claim 14, wherein the second salt comprising nitrogen and oxygen containing salts are selected from the group consisting of nitrates, nitrites and combinations thereof.

23. The method of claim 22, wherein the second salts are phosphates.

24. The method of claim 14, wherein the nitrogen-containing compound comprises two or more groups selected from the groups consisting of —NH2, =O2, —OH, and =NH and —NH—.

25. The method of claim 24, wherein the nitrogen-containing compound is selected from the group consisting of urea, N-butylurea, biuret, biguanide, ammeline, ligosulphonate, and combinations and derivatives thereof.

26. The method of claim 25, wherein the nitrogen-containing compound is urea.

27. The method of claim 14, wherein the inert environment comprises at least one gas selected from nitrogen, argon, and the noble gases.

28. The method of claim 14, wherein steps (b) and step (c) are carried out in a reactor capable of generating the energy or temperature required.

29. The method of claim 28, wherein the reactor is selected from the group consisting of tube furnaces, rotary furnaces, belt furnaces, fluidized bed reactors, microwaves, infrared heaters, and derivatives thereof.

* * * * *